(12) United States Patent
Han

(10) Patent No.: US 11,685,245 B2
(45) Date of Patent: Jun. 27, 2023

(54) POWER TRANSMISSION DEVICE AND AUTOMOBILE INCLUDING THE SAME

(71) Applicant: HYUNDAI MOBIS CO., LTD., Seoul (KR)

(72) Inventor: Kyung Won Han, Yongin-si (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 0 days.

(21) Appl. No.: 17/490,233

(22) Filed: Sep. 30, 2021

(65) Prior Publication Data
US 2022/0348062 A1 Nov. 3, 2022

(30) Foreign Application Priority Data
Apr. 29, 2021 (KR) .................. 10-2021-0055527

(51) Int. Cl.
*B60K 1/00* (2006.01)
*F16H 3/66* (2006.01)
(Continued)

(52) U.S. Cl.
CPC ............ *B60K 1/00* (2013.01); *B60K 17/08* (2013.01); *F16H 37/042* (2013.01);
(Continued)

(58) Field of Classification Search
CPC .. B60K 1/00; B60K 2001/001; B60K 17/046; F16H 2200/2038–2061;
(Continued)

(56) References Cited

U.S. PATENT DOCUMENTS 4,884,472 A * 12/1989 Miura .................. F16H 3/663 74/606 R
5,135,444 A * 8/1992 Hattori ................ F16H 3/663 475/285

(Continued)

FOREIGN PATENT DOCUMENTS

DE 10 2013 016 441 A1 4/2015
DE 10 2016 002 567 A1 9/2017
(Continued)

OTHER PUBLICATIONS

Extended European search report dated Feb. 17, 2022, in counterpart European Patent Application No. 21196355.8 (8 pages in English).
(Continued)

*Primary Examiner* — Ernesto A Suarez
*Assistant Examiner* — Lillian T Nguyen
(74) *Attorney, Agent, or Firm* — NSIP Law

(57) ABSTRACT

A power transmission device including: a motor to drive a rotary shaft; a first reducer connected to the rotary shaft to reduce rotational angular velocity of the rotary shaft; a second reducer connected to the rotary shaft to reduce
(Continued)

rotational angular velocity of the rotary shaft; a first clutch disposed between the rotary shaft and the first reducer to connect and disconnect the rotary shaft and the first reducer; a second clutch disposed between the rotary shaft and the second reducer to connect and disconnect the rotary shaft and the second reducer; and a third clutch disposed outside the second reducer to connect and disconnect the second reducer and an external component.

17 Claims, 2 Drawing Sheets

(51) Int. Cl.
  *B60K 17/08* (2006.01)
  *F16H 37/04* (2006.01)
(52) U.S. Cl.
  CPC .......... *B60K 2001/001* (2013.01); *F16H 3/66* (2013.01); *F16H 3/663* (2013.01); *F16H 2200/0021* (2013.01); *F16H 2200/2007* (2013.01); *F16H 2200/2038* (2013.01); *F16H 2200/2041* (2013.01); *F16H 2702/02* (2013.01)
(58) Field of Classification Search
  CPC .......... F16H 2200/2007–2017; F16H 2702/02; F16H 3/663; F16H 2200/202–2028
  See application file for complete search history.

(56) References Cited

U.S. PATENT DOCUMENTS

| | | | |
|---|---|---|---|
| 9,707,834 B2* | 7/2017 | Lee | F16H 3/62 |
| 2007/0184932 A1* | 8/2007 | Tabata | F16H 3/666 |
| | | | 475/275 |
| 2007/0275813 A1* | 11/2007 | Raghavan | F16H 3/663 |
| | | | 475/275 |
| 2015/0330492 A1 | 11/2015 | Lee et al. | |

FOREIGN PATENT DOCUMENTS

| | | | | |
|---|---|---|---|---|
| DE | 10 2017 121 627 B3 | 11/2018 | | |
| DE | 10 2018 111 800 A1 | 1/2019 | | |
| DE | 10 2018 116 197 A1 | 1/2020 | | |
| DE | 102018 130 123 A1 | 5/2020 | | |
| DE | 102018128955 A1 * | 5/2020 | | |
| JP | H08247230 A * | 9/1996 | ............. | F16H 3/663 |
| JP | 2018-112221 A | 7/2018 | | |
| WO | WO-2018115227 A1 * | 6/2018 | ............. | B60K 6/365 |

OTHER PUBLICATIONS

Korean Office Action dated Nov. 10, 2022, in counterpart Korean Patent Application No. 10-2021-0055527 (9 pages in Korean).

* cited by examiner

POWER TRANSMISSION DEVICE AND AUTOMOBILE INCLUDING THE SAME

CROSS-REFERENCE TO RELATED APPLICATION(S)

This application claims priority from and the benefit of Korean Patent Application No. 10-2021-0055527, filed on Apr. 29, 2021, which is hereby incorporated by reference for all purposes as if set forth herein.

TECHNICAL FIELD

Exemplary embodiments relate to a power transmission device and an automobile including the power transmission device and, more particularly, to a power transmission device enabling variable speed reduction and an automobile including the power transmission device.

BACKGROUND

In electric automobiles equipped with a reducer that reduces a rotation speed of a motor and transmits the reduced rotation speed to wheels, a planetary gear reducer having a structure, in which a sun gear, a planetary gear, a ring gear, and a carrier are coupled to each other, is generally provided.

A plurality of different reduction ratios of the planetary gear mounted to an automobile may be required so as to obtain the optimal efficiency according to traveling conditions of the automobile. However, the structure of the reducer becomes complicated so as to provide a plurality of reduction ratios. Thus, not only does the volume occupied by the reducer increase, but also the durability of the reducer is deteriorated due to the complicated structure. Thus, in order to manufacture the reducer that provides the plurality of reduction ratios, the configuration of the reducer needs to be simplified, and the durability of the reducer also needs to be improved.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a power transmission device includes: a motor configured to drive a rotary shaft; a first reducer connected to the rotary shaft and configured to reduce rotational angular velocity of the rotary shaft; a second reducer connected to the rotary shaft and configured to reduce rotational angular velocity of the rotary shaft; a first clutch disposed between the rotary shaft and the first reducer and configured to connect and disconnect the rotary shaft and the first reducer; a second clutch disposed between the rotary shaft and the second reducer and configured to connect and disconnect the rotary shaft and the second reducer; and a third clutch disposed outside the second reducer and configured to connect and disconnect the second reducer and an external component.

The first reducer may include: a first sun gear disposed on one side of the first clutch and configured to be engaged with the rotary shaft or disengaged from the rotary shaft by the first clutch; and a first planetary gear disposed on the outside of the first sun gear and engaged with the first sun gear.

The second reducer may include: a second sun gear disposed on one side of the second clutch and configured to be engaged with the rotary shaft or disengaged from the rotary shaft by the second clutch; and a second planetary gear disposed on the outside of the second sun gear and engaged with the second sun gear, and the first planetary gear and the second planetary gear may be connected to each other.

The power transmission device may further include a carrier coupled to the first planetary gear and the second planetary gear, and rotation motion may be synchronized between the first planetary gear and the second planetary gear.

The second reducer may further include a ring gear disposed on the outside of the second planetary gear and engaged with the second planetary gear.

The third clutch may be configured to connect and disconnect the ring gear and the external component.

The power transmission device may further include a fourth clutch configured to connect and disconnect the second reducer and the external component.

The fourth clutch may be configured to connect and disconnect the second sun gear and the external component.

The second planetary gear may include: an inner planetary gear disposed on the outside of the second sun gear and engaged with the second sun gear; and an outer planetary gear disposed on the outside of the inner planetary gear and engaged with the inner planetary gear. The outer planetary gear may be engaged with the ring gear.

The power transmission device may further include a differential gear connected to the carrier.

The carrier may be coupled to the first planetary gear and the outer planetary gear.

A distance between the first reducer and the motor may be greater than a distance between the second reducer and the motor.

A distance between the differential gear and the motor may be greater than a distance between the first reducer and the motor.

The second reducer may further include a connection member that extends from the carrier to connect the carrier to the inner planetary gear.

The third clutch may be disposed between the first clutch and the second clutch in a direction in which the rotary shaft extends.

In another general aspect, an automobile includes: a left wheel disposed on a left side of the automobile and a right wheel disposed on a right side of the automobile; and a power transmission device configured to provide torque to the left wheel and the right wheel. The power transmission device includes: a motor configured to drive a rotary shaft; a first reducer connected to the rotary shaft and configured to reduce rotational angular velocity of the rotary shaft; a second reducer connected to the rotary shaft and configured to reduce rotational angular velocity of the rotary shaft; a first clutch disposed between the rotary shaft and the first reducer and configured to connect and disconnect the rotary shaft and the first reducer; a second clutch disposed between the rotary shaft and the second reducer and configured to connect and disconnect the rotary shaft and the second reducer; and a third clutch disposed outside the second reducer and configured to connect and disconnect the second reducer and an external component.

In another general aspect, a power transmission device includes: a motor configured to drive a rotary shaft; a first reducer connected to the rotary shaft and configured to reduce rotational angular velocity of the rotary shaft at a first reduction ratio; a second reducer connected to the rotary shaft and configured to reduce rotational angular velocity of the rotary shaft at a second reduction ratio different from the first reduction ratio; a first clutch disposed between the rotary shaft and the first reducer and configured to selectively transmit power from the rotary shaft directly to the first reducer; and a second clutch disposed between the rotary shaft and the second reducer and configured to selectively transmit power from the rotary shaft directly to the second reducer.

Other features and aspects will be apparent from the following detailed description, the drawings, and the claims.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION

Hereinafter, a power transmission device and an automobile including the power transmission device according to the present disclosure will be described with reference to the drawings.

Power Transmission Device

Figure 1:
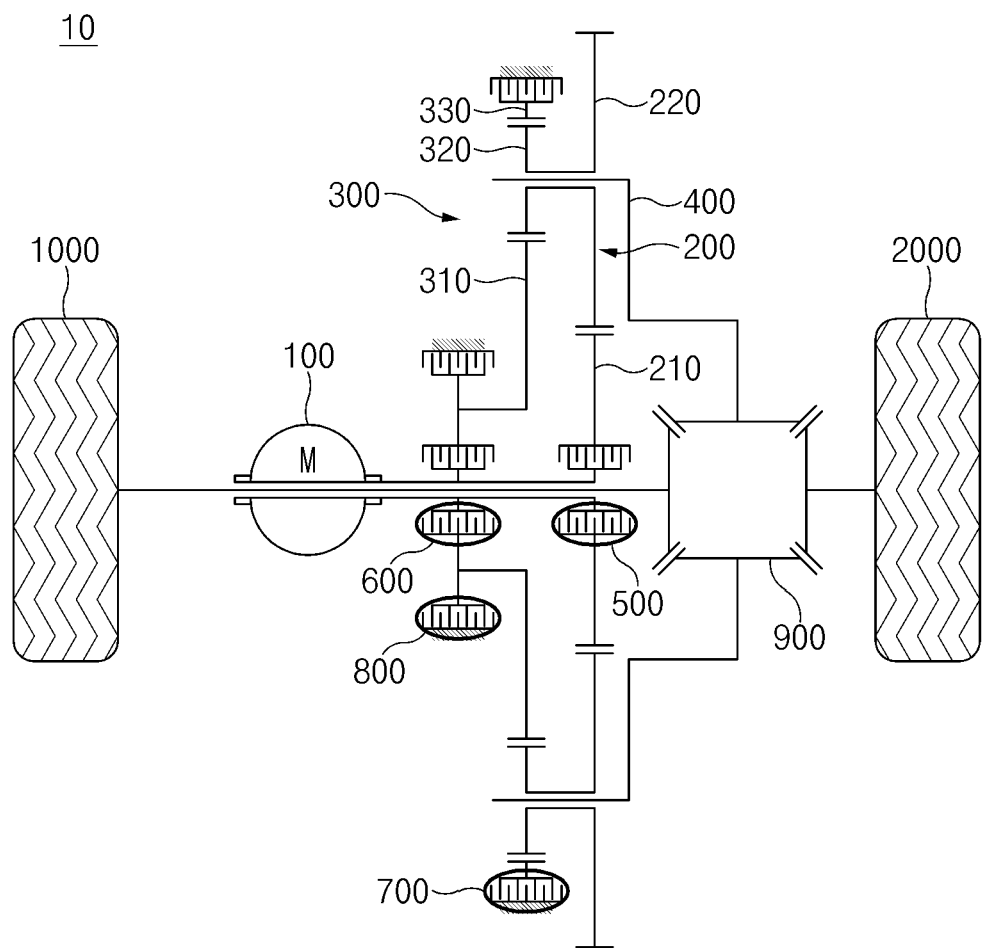
FIG. 1 is a view illustrating a structure of a power transmission device according to an exemplary embodiment of the present disclosure.
Figure 2:
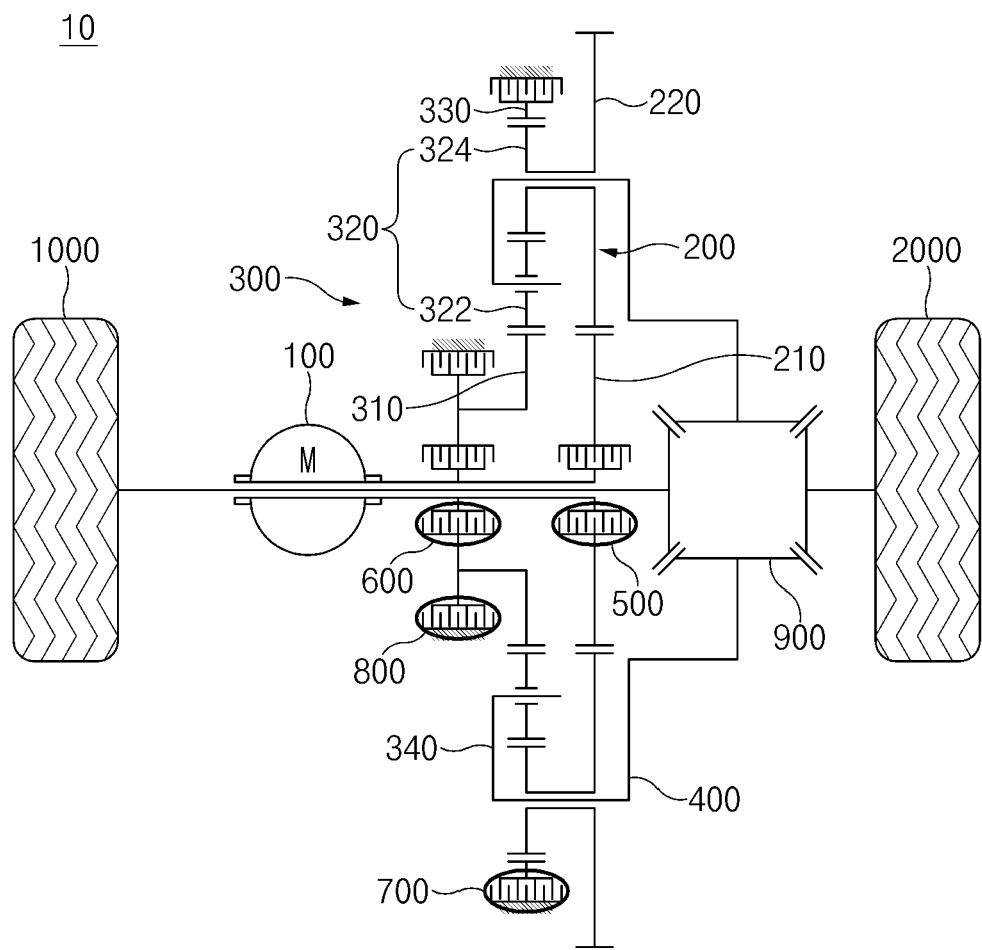
FIG. 2 is a view illustrating a structure of a power transmission device according to another exemplary embodiment of the present disclosure.

FIG. 1 is a view illustrating a structure of a power transmission device according to an exemplary embodiment of the present disclosure, and FIG. 2 is a view illustrating a structure of a power transmission device according to another exemplary embodiment of the present disclosure.

As illustrated in FIGS. 1 and 2, a power transmission device 10 according to the present disclosure may include a motor 100 that generates power to drive a rotary shaft. As illustrated in FIGS. 1 and 2, the motor 100 may be provided outside wheels 1000 and 2000, but on the other hand, the motor 100 may be provided inside the wheels 1000 and 2000. Meanwhile, according to the present disclosure, the rotary shaft driven by the motor 100 may have a straight line shape.

Also, the power transmission device 10 may further include a plurality of reducers 200 and 300 which are connected to the rotary shaft and reduce rotational angular velocity of the rotary shaft. More specifically, the reducers may include: a first reducer 200 connected to the rotary shaft of the motor 100 and reducing rotational angular velocity of the rotary shaft; and a second reducer 300 connected to the rotary shaft of the motor 100 and reducing rotational angular velocity of the rotary shaft.

Also, the power transmission device 10 may include: a first clutch 500 provided between the rotary shaft and the first reducer 200 and connecting or disconnecting the rotary shaft and the first reducer 200; and a second clutch 600 provided between the rotary shaft and the second reducer 300 and connecting or disconnecting the rotary shaft and the second reducer 300. That is, according to the present disclosure, the power may be selectively directly and transmitted from the rotary shaft of the motor 100 to the first reducer 200 by the first clutch 500, and the power may be selectively and directly transmitted from the rotary shaft of the motor 100 to the second reducer 300 by the second clutch 600. Here, the power is 'directly' transmitted from the rotary shaft of the motor to the reducer, and this may mean that the power of the rotary shaft driven by the motor is directly transmitted to the reducer via the clutch without going through other paths.

Meanwhile, according to the present disclosure, a reduction ratio by the first reducer 200 may be different from a reduction ratio by the second reducer 300. Thus, when the power transmission device 10 according to the present disclosure is mounted to an automobile, a rotational angular velocity of the rotary shaft rotated by the motor is reduced at a plurality of reduction ratios, and then, torque may be transmitted to the wheel. Thus, efficient power transmission according to traveling conditions of the automobile may be achieved.

Also, according to the present disclosure, there may be further provided a third clutch 700 which is provided outside the second reducer 300 and connects or disconnects the second reducer 300 and an external component of the power transmission device 10. The external component described above when the power transmission device 10 is mounted to the automobile may be a component which is not moved relative to the automobile but fixed thereto.

Meanwhile, the first reducer 200 may include a first sun gear 210 which is provided on one side of the first clutch 500 and may be engaged with the rotary shaft or disengaged from the rotary shaft by the first clutch 500. More specifically, when the first sun gear 210 is engaged with the rotary shaft by the first clutch 500, the first sun gear 210 may rotate at the same rotational angular velocity as the rotary shaft. However, when the first sun gear 210 is disconnected from the rotary shaft by the first clutch 500, the first sun gear 210 may rotate independently of rotation of the rotary shaft.

Also, the first reducer 200 may further include a first planetary gear 220 which is provided on the outside of the first sun gear 210 and engaged with the first sun gear 210. That is, the first planetary gear 220 may revolve outside the first sun gear 210. Thus, according to the present disclosure, the speed is reduced as the power is transmitted from the first sun gear 210 to the first planetary gear 220.

Meanwhile, the second reducer 300 may include a second sun gear 310 which is provided on one side of the second clutch 600 and may be engaged with the rotary shaft or disengaged from the rotary shaft by the second clutch 600. More specifically, when the second sun gear 310 is engaged with the rotary shaft by the second clutch 600, the second sun gear 310 may rotate at the same rotational angular velocity as the rotary shaft. However, when the second sun gear 310 is disconnected from the rotary shaft by the second clutch 600, the second sun gear 310 may rotate independently of rotation of the rotary shaft.

Also, the second reducer 300 may further include a second planetary gear 320 which is provided on the outside of the second sun gear 310 and engaged with the second sun gear 310. That is, the second planetary gear 320 may revolve outside the second sun gear 310. Thus, according to the present disclosure, the speed is reduced as the power is transmitted from the second sun gear 310 to the second planetary gear 320.

Continuing to refer to FIGS. 1 and 2, the second reducer 300 may further include a ring gear 330 which is provided on the outside of the second planetary gear 320 and engaged with the second planetary gear 320. Thus, the second planetary gear 320 may rotate inside the ring gear 330 and, at the same time, may revolve.

Meanwhile, according to the present disclosure, the first planetary gear 220 and the second planetary gear 320 may be connected to each other so that power is transmitted therebetween. More specifically, the power transmission device 10 according to the present disclosure may further include a carrier 400 which is coupled to the first planetary gear 220 and the second planetary gear 320. More preferably, the rotation motion may be synchronized with each other between the first planetary gear 220 and the second planetary gear 320. That is, according to the present disclosure, when the first planetary gear 220 rotates, the second planetary gear 320 may rotate at the same rotational angular velocity as the first planetary gear 220. On the contrary, when the second planetary gear 320 rotates, the first planetary gear 220 may rotate at the same rotational angular velocity as the second planetary gear 320. For example, the first planetary gear 220 and the second planetary gear 320 may be connected directly to each other and fixed to each other.

Meanwhile, according to the present disclosure, the third clutch 700 described above may connect or disconnect the ring gear 330 and the external component of the power transmission device 10. That is, according to the present disclosure, the ring gear 330 may be fixed to the external component when the ring gear 330 is engaged with the external component by the third clutch 700, and the ring gear 330 may be moved independently of the external component when the ring gear 330 is disconnected from the external component by the third clutch 700.

Continuing to refer to FIGS. 1 and 2, the power transmission device 10 according to the present disclosure may further include a fourth clutch 800 which connects or disconnects the second reducer 300 and the external component of the power transmission device 10. More specifically, the fourth clutch 800 may connect or disconnect the second sun gear 310 and the external component of the power transmission device 10. That is, according to the present disclosure, the second sun gear 310 may be fixed to the external component when the second sun gear 310 is engaged with the external component by the fourth clutch 800, and the second sun gear 310 may be moved independently of the external component when the second sun gear 310 is disconnected from the external component by the fourth clutch 800.

Meanwhile, the power transmission device 10 according to the present disclosure may further include a differential gear 900 connected to the carrier 400. There is a difference in rotation speeds between a left wheel and a right wheel, for example, when the automobile is steered, and the differential gear 900 may be component for providing the left wheel and the right wheel with torques having different rotation speeds. The description of the detailed configuration of the differential gear 900 will be replaced with the description of a differential gear known from the related art.

Based on the above description, a driving method of the power transmission device 10 according to the present disclosure will be described below.

In the power transmission device 10 according to the present disclosure, three types of speed reduction modes may be obtained.

First, in a first stage-speed reduction mode by the power transmission device 10, the rotary shaft of the motor 100 is engaged with the first sun gear 210 by the first clutch 500, and the ring gear 330 is engaged with the external component of the power transmission device by the third clutch 700. On the other hand, the rotary shaft of the motor 100 is disconnected from the second sun gear 310 by the second clutch 600, and the second sun gear 310 is disconnected from the external component of the power transmission device by the fourth clutch 800. Thus, the torque of the rotary shaft according to the driving of the motor 100 is transmitted to the carrier 400 through the first sun gear 210, the first planetary gear 220, the second planetary gear 320, and the ring gear 330. Thus, compared to the rotational angular velocity of the rotary shaft, the carrier 400 rotates at a rotational angular velocity which is reduced at a first reduction ratio. Meanwhile, the second sun gear 310, which is not engaged with the rotary shaft, rotates by being engaged with the rotation of the second planetary gear 320.

Second, in a second stage-speed reduction mode by the power transmission device 10, the rotary shaft of the motor 100 is engaged with the first sun gear 210 by the first clutch 500, and the second sun gear 310 is engaged with the external component of the power transmission device by the fourth clutch 800. On the other hand, the rotary shaft of the motor 100 is disconnected from the second sun gear 310 by the second clutch 600, and the ring gear 330 is disconnected from the external component of the power transmission device by the third clutch 700. Thus, the torque of the rotary shaft according to the driving of the motor 100 is transmitted to the carrier 400 through the first sun gear 210, the first planetary gear 220, the second planetary gear 320, and the second sun gear 310. Thus, compared to the rotational angular velocity of the rotary shaft, the carrier 400 rotates at a rotational angular velocity which is reduced at a second reduction ratio. Meanwhile, the ring gear 330, which is not engaged with the external component, rotates by being engaged with the rotation of the second planetary gear 320.

Third, in a third stage-speed reduction mode by the power transmission device 10, the rotary shaft of the motor 100 is engaged with the second sun gear 310 by the second clutch 600, and the ring gear 330 is engaged with the external component of the power transmission device by the third clutch 700. On the other hand, the rotary shaft of the motor 100 is disconnected from the first sun gear 210 by the first clutch 500, and the second sun gear 310 is disconnected from the external component of the power transmission device by the fourth clutch 800. Thus, the torque of the rotary shaft according to the driving of the motor 100 is transmitted to the carrier 400 through the second sun gear 310, the second planetary gear 320, and the ring gear 330. Thus, compared to the rotational angular velocity of the rotary shaft, the carrier 400 rotates at a rotational angular velocity which is reduced at a third reduction ratio. On the other hand, the first sun gear 210 and the first planetary gear 220 may rotate or revolve by being engaged with the rotation of the second planetary gear 320.

Also, the second sun gear 310 is engaged with the external component of the power transmission device by the fourth clutch 800, and the ring gear 330 is engaged with the external component of the power transmission device by the third clutch 700. In this case, a parking state may be obtained. On the other hand, the second sun gear 310 is disconnected from the external component of the power transmission device by the fourth clutch 800, and the ring gear 330 is disconnected from the external component of the power transmission device by the third clutch 700. In this case, it is possible to prevent the power from being transmitted to the carrier 400 during traveling.

Meanwhile, when $Z_{S1}$ is the number of teeth on the first sun gear 210, $Z_{S2}$ is the number of teeth on the second sun gear 310, $Z_{P1}$ is the number of teeth on the first planetary gear 220, $Z_{P2}$ is the number of teeth on the second planetary gear 320, and $Z_R$ is the number of teeth on the ring gear 330, a first reduction ratio $R_1$, a second reduction ratio $R_2$, and a third reduction ratio $R_3$ of the power transmission device 10 according to exemplary embodiment of the present disclosure may be expressed as below.

$$R_1=(Z_{P1}/Z_{S1})\times(Z_R/Z_{P2})+1$$

$$R_2=(Z_{P1}/Z_{S1})\times(Z_{S2}/Z_{P2})+1$$

$$R_3=(Z_R/Z_{S2})+1$$

Meanwhile, referring to FIG. 2, according to another exemplary embodiment of the present disclosure, a second planetary gear 320 may include a plurality of different planetary gears unlike the exemplary embodiment of the present disclosure. More specifically, the second planetary gear 320 may include: an inner planetary gear 322 provided on the outside of the second sun gear 310 and engaged with the second sun gear 310; and an outer planetary gear 324 provided on the outside of the inner planetary gear 322 and engaged with the inner planetary gear 322. The outer planetary gear 324 is engaged with the ring gear 330. As described above and illustrated in FIG. 2, in a case where the second planetary gear 320 includes the inner planetary gear 322 and the outer planetary gear 324, more various types of reduction ratios may be obtained. Thus, a degree of freedom in terms of designing a power transmission device 10 may be improved.

Meanwhile, according to another exemplary embodiment of the present disclosure, the rotation motion may be synchronized with each other between a first planetary gear 220 and the outer planetary gear 324. That is, according to another exemplary embodiment of the present disclosure, similar to the exemplary embodiment of the present disclosure, when the first planetary gear 220 rotates, the outer planetary gear 324 may rotate at the same rotational angular velocity as the first planetary gear 220. On the contrary, when the outer planetary gear 324 rotates, the first planetary gear 220 may rotate at the same rotational angular velocity as the outer planetary gear 324. For example, the first planetary gear 220 and the outer planetary gear 324 may be connected directly to each other and fixed to each other. Also, according to another exemplary embodiment of the present disclosure, similar to the exemplary embodiment of the present disclosure, a carrier 400 may be coupled to the first planetary gear 220 and the outer planetary gear 324, and the inner planetary gear 322 may be connected to the carrier 400 through a connection member 340. More specifically, a second reducer 300 may further include the connection member 340, which extends from the carrier 400 and connects the carrier 400 and the inner planetary gear 322 to each other. For example, the connection member 340 may be a shaft member for providing a central shaft about which the inner planetary gear 322 rotates, and the shaft member may be connected to the carrier 400.

Meanwhile, when $Z_{P2O}$ is the number of teeth on the outer planetary gear 324, a first reduction ratio $R_4$, a second reduction ratio $R_5$, and a third reduction ratio $R_6$ of the power transmission device 10 according to another exemplary embodiment of the present disclosure may be expressed as below.

$$R_4=(Z_{P1}/Z_{S1})\times(Z_R/Z_{P2O})+1$$

$$R_5=(Z_{P1}/Z_{S1})\times(Z_{S2}/Z_{P2O})+1$$

$$R_6=(Z_R/Z_{S2})+1$$

That is, investigating the above equations with respect to $R_4$ to $R_6$, the number of teeth on the inner planetary gear 322 does not affect the first to third reduction ratios (e.g., $R_4$ to $R_6$) in another exemplary embodiment of the present disclosure.

Meanwhile, referring to FIGS. 1 and 2 again, a distance between the first reducer 200 and the motor 100 is illustrated as being greater than a distance between the second reducer 300 and the motor 100, and a distance between the differential gear 900 and the motor 100 is illustrated as being greater than a distance between the first reducer 200 and the motor 100. However, unlike illustrated in FIGS. 1 and 2, the distance between the first reducer 200 and the motor 100 may be less than the distance between the second reducer 300 and the motor 100, and the distance between the differential gear 900 and the motor 100 may also be less than the distance between the first reducer 200 and the motor 100.

Meanwhile, for example, as illustrated in FIGS. 1 and 2, the third clutch 700 may be provided between the first clutch 500 and the second clutch 600 in a direction in which the rotary shaft of the motor 100 extends.

Automobile

Referring to FIGS. 1 and 2, an automobile according to the present disclosure may include: a left wheel 1000 and a right wheel 2000 provided on the left side and the right side of the automobile, respectively; and a power transmission device 10 for providing torque to the left wheel 1000 and the right wheel 2000.

The power transmission device 10 may include: a motor 100 for driving a rotary shaft; a first reducer 200 connected to the rotary shaft and reducing rotational angular velocity of the rotary shaft; a second reducer 300 connected to the rotary shaft and reducing rotational angular velocity of the rotary shaft; a first clutch 500 provided between the rotary shaft and the first reducer 200 and connecting or disconnecting the rotary shaft and the first reducer 200; a second clutch 600 provided between the rotary shaft and the second reducer 300 and connecting or disconnecting the rotary shaft and the second reducer 300; and a third clutch 700 provided outside the second reducer 300 and connecting or disconnecting the second reducer 300 and an external component of the power transmission device. The content described above with respect to the power transmission device 10 according to the exemplary embodiment and another exemplary embodiment of the present disclosure may also be applied, in the same manner, to the automobile according to the present disclosure.

According to the present disclosure, the reducer for an automobile may be manufactured, which is capable of providing the plurality of reduction ratios even with the simple structure compared to the related art and also has the improved durability.

Although the present disclosure has been described with specific exemplary embodiments and drawings, the present disclosure is not limited thereto, and it is obvious that various changes and modifications may be made by a person skilled in the art to which the present disclosure pertains within the technical idea of the present disclosure and equivalent scope of the appended claims.

What is claimed is:

1. A power transmission device comprising:
a motor configured to drive a rotary shaft;
a first reducer connected to the rotary shaft and configured to reduce rotational angular velocity of the rotary shaft at a first reduction ratio;
a second reducer connected to the rotary shaft and configured to reduce rotational angular velocity of the rotary shaft at a second reduction ratio different from the first reduction ratio;

a first clutch disposed between the rotary shaft and the first reducer and configured to connect and disconnect the rotary shaft and the first reducer;
a second clutch disposed between the rotary shaft and the second reducer and configured to connect and disconnect the rotary shaft and the second reducer;
a third clutch disposed outside the second reducer and configured to connect and disconnect the second reducer and an external component;
a fourth clutch configured to connect and disconnect the second reducer and the external component,
wherein a path of power transmission of torque of the rotary shaft when the second reducer and the external component are disconnected by the fourth clutch is different from a path of power transmission of torque of the rotary shaft when the second reducer and the external component are engaged by the fourth clutch; and
a carrier connected to the first reducer and the second reducer, wherein the third clutch and the fourth clutch are configured to provide a parking state when engaged and to prevent power from being transmitted to the carrier while in motion when disconnected.

2. The power transmission device of claim 1, wherein the first reducer comprises:
a first sun gear disposed on one side of the first clutch and configured to be engaged with the rotary shaft or disengaged from the rotary shaft by the first clutch; and
a first planetary gear disposed on the outside of the first sun gear and engaged with the first sun gear.

3. The power transmission device of claim 2, wherein the second reducer comprises:
a second sun gear disposed on one side of the second clutch and configured to be engaged with the rotary shaft or disengaged from the rotary shaft by the second clutch; and
a second planetary gear disposed on the outside of the second sun gear and engaged with the second sun gear,
wherein the first planetary gear and the second planetary gear are connected to each other.

4. The power transmission device of claim 3, wherein the coupled is coupled to the first planetary gear and the second planetary gear, and
wherein rotation motion is synchronized between the first planetary gear and the second planetary gear.

5. The power transmission device of claim 4, further comprising a differential gear connected to the carrier.

6. The power transmission device of claim 5, wherein a distance between the differential gear and the motor is greater than a distance between the first reducer and the motor.

7. The power transmission device of claim 4, wherein the second reducer further comprises a ring gear disposed on the outside of the second planetary gear and engaged with the second planetary gear.

8. The power transmission device of claim 7, wherein the third clutch is configured to connect and disconnect the ring gear and the external component.

9. The power transmission device of claim 7, wherein the second planetary gear comprises:
an inner planetary gear disposed on the outside of the second sun gear and engaged with the second sun gear; and
an outer planetary gear disposed on the outside of the inner planetary gear and engaged with the inner planetary gear, the outer planetary gear being engaged with the ring gear.

10. The power transmission device of claim 9, wherein the carrier is coupled to the first planetary gear and the outer planetary gear.

11. The power transmission device of claim 10, wherein the second reducer further comprises a connection member that extends from the carrier and connects the carrier to the inner planetary gear.

12. The power transmission device of claim 9, wherein a number of teeth on the inner planetary gear does not affect the first to third reduction ratios.

13. The power transmission device of claim 2, wherein the reduction ratios are based on $$R_1=(Z_{P1}/Z_{S1})\times(Z_R/Z_{P2})+1$$

$$R_2=(Z_{P1}/Z_{S1})\times(Z_{S2}/Z_{P2})+1$$

$$R_3=(Z_R/Z_{S2})+1$$

wherein $Z_{S1}$, is a number of teeth on the first sun gear, $Z_{S2}$ is a number of teeth on the second sun gear, $Z_{P1}$, is a number of teeth on the first planetary gear, $Z_{P2}$ is a number of teeth on the second planetary gear, and $Z_R$ is a number of teeth on the ring gear, $R_1$ is the first reduction ratio, $R_2$ is the second reduction ratio, and $R_3$ is the third reduction ratio of the power transmission device.

14. The power transmission device of claim 1, wherein the fourth clutch is configured to connect and disconnect the second sun gear and the external component.

15. The power transmission device of claim 1, wherein a distance between the first reducer and the motor is greater than a distance between the second reducer and the motor.

16. The power transmission device of claim 1, wherein the third clutch is disposed between the first clutch and the second clutch in a direction in which the rotary shaft extends.

17. An automobile comprising:
a left wheel disposed on a left side of the automobile and a right wheel disposed on a right side of the automobile; and
a power transmission device configured to provide torque to the left wheel and the right wheel, wherein the power transmission device comprises:
a motor configured to drive a rotary shaft;
a first reducer connected to the rotary shaft and configured to reduce rotational angular velocity of the rotary shaft at a first reduction ratio;
a second reducer connected to the rotary shaft and configured to reduce rotational angular velocity of the rotary shaft at a second reduction ratio different from the first reduction ratio;
a first clutch disposed between the rotary shaft and the first reducer and configured to connect and disconnect the rotary shaft and the first reducer;
a second clutch disposed between the rotary shaft and the second reducer and configured to connect and disconnect the rotary shaft and the second reducer;
a third clutch disposed outside the second reducer and configured to connect and disconnect the second reducer and an external component; and
a fourth clutch configured to connect and disconnect the second reducer and the external component,
wherein a path of power transmission of torque of the rotary shaft when the second reducer and the external component are disconnected by the fourth clutch is different from a path of power transmission of torque of the rotary shaft when the second reducer and the external component are engaged by the fourth clutch; and wherein the third clutch and the fourth clutch are configured to provide a parking state when engaged and to prevent power from being transmitted to a carrier while in motion when disconnected.

* * * * *